US006008975A

United States Patent [19]

Kester et al.

[11] Patent Number: 6,008,975

[45] Date of Patent: Dec. 28, 1999

[54] SELF-COMPRESSIVE SURGE ARRESTER MODULE AND METHOD OF MAKING SAME

[75] Inventors: Jeffrey Joseph Kester, Richfield, Ohio; Todd R. Hoover, Bowling Green, Ky.; David P. Bailey, Portville, N.Y.; Charles W. Daley, Olean, N.Y.; Tomon K. Raimondi, Olean, N.Y.

[73] Assignee: McGraw-Edison Company, Houston, Tex.

[21] Appl. No.: 09/142,079

[22] PCT Filed: Mar. 3, 1997

[86] PCT No.: PCT/US97/03518

§ 371 Date: Nov. 20, 1998

§ 102(e) Date: Nov. 20, 1998

[87] PCT Pub. No.: WO97/32382

PCT Pub. Date: Sep. 4, 1997

[51] Int. Cl.[6] .................................................. H02H 1/00

[52] U.S. Cl. ............................ 361/117; 361/56; 361/111; 361/127

[58] Field of Search ............................ 361/56, 91.1, 111, 361/115, 117, 118, 127

[56] References Cited

U.S. PATENT DOCUMENTS

| | | | |
|---|---|---|---|
| T102,103 | 8/1982 | Lenk | 361/110 |
| 2,050,334 | 8/1936 | Kellogg | 175/30 |
| 2,586,285 | 2/1952 | Ackermann | 175/30 |
| 2,587,587 | 3/1952 | Bellezza et al. | 174/140 |
| 2,593,955 | 4/1952 | Ackermann | 175/30 |
| 2,947,903 | 8/1960 | Westrom | 313/231 |
| 2,997,529 | 8/1961 | Fink | 174/138 |
| 3,018,406 | 1/1962 | Innis | 315/36 |
| 3,261,910 | 7/1966 | Jacquier | 174/178 |
| 3,302,154 | 1/1967 | Bauer | 338/114 |
| 3,328,631 | 6/1967 | Greber | 315/36 |
| 3,412,273 | 11/1968 | Kennon et al. | 313/1 |
| 3,524,107 | 8/1970 | Reitz | 317/51 |
| 3,566,183 | 2/1971 | Olsen | 315/36 |

(List continued on next page.)

FOREIGN PATENT DOCUMENTS

| | | | |
|---|---|---|---|
| 0 008 181 | 2/1980 | European Pat. Off. | H01C 7/12 |
| 730710 | 5/1955 | United Kingdom . | |
| 1109151 | 1/1964 | United Kingdom | H01B 17/00 |
| 1505875 | 3/1978 | United Kingdom | H01B 17/38 |
| 2 188 199 | 9/1987 | United Kingdom | H01C 7/12 |

*Primary Examiner*—Stephen W Jackson
*Attorney, Agent, or Firm*—Fish & Richardson P.C.

[57] ABSTRACT

A surge arrester module having an array of MOV's and other components includes an insulative coating (16) for applying an axially compressive force to the stacked array. The component stack (20), while held in an axially compressed condition, receives the insulative casing that includes thermosetting resin that, when cured, has a coefficient of thermal expansion that is greater than that of the components of the stack. The coated stack is then cured at a temperature that exceeds the maximum expected temperature that will be experienced by the arrester components. Upon cooling, the components of the array are held in compression and adequate electrical contact with each other is maintained by the casing. Fiberglass strands (24, 28) are included in the casing for reinforcement and cantilever strength. A method of manufacturing the module is also disclosed.

49 Claims, 7 Drawing Sheets

U.S. PATENT DOCUMENTS

| | | | |
|---|---|---|---|
| 3,567,541 | 3/1971 | Kaczerginski | 156/172 |
| 3,586,934 | 6/1971 | Nakata | 317/261 |
| 3,631,323 | 12/1971 | Pittmann | 317/61.5 |
| 3,706,009 | 12/1972 | Reitz | 317/68 |
| 3,725,745 | 4/1973 | Zisa | 317/104 |
| 3,850,722 | 11/1974 | Kreft | 156/172 |
| 3,869,650 | 3/1975 | Cunningham et al. | 317/61 |
| 3,898,372 | 8/1975 | Kalb | 174/179 |
| 3,913,127 | 10/1975 | Suzuki et al. | 357/73 |
| 3,973,172 | 8/1976 | Yost | 317/61 |
| 3,987,343 | 10/1976 | Cunningham et al. | 317/61.5 |
| 4,029,380 | 6/1977 | Yonkers | 339/60 R |
| 4,092,694 | 5/1978 | Stetson | 361/126 |
| 4,100,588 | 7/1978 | Kresge | 361/127 |
| 4,107,567 | 8/1978 | Cunningham et al. | 313/325 |
| 4,161,012 | 7/1979 | Cunningham | 361/128 |
| 4,218,721 | 8/1980 | Stetson | 368/117 |
| 4,298,900 | 11/1981 | Avdeenko et al. | 361/127 |
| 4,326,232 | 4/1982 | Nishiwaki et al. | 361/127 |
| 4,404,614 | 9/1983 | Koch et al. | 361/128 |
| 4,456,942 | 6/1984 | Bronikowski | 361/127 |
| 4,463,405 | 7/1984 | Koch et al. | 361/135 |
| 4,467,387 | 8/1984 | Bergh et al. | 361/132 |
| 4,491,687 | 1/1985 | Kaczerginski et al. | 174/178 |
| 4,656,555 | 4/1987 | Raudsbaugh | 361/117 |
| 4,812,944 | 3/1989 | Eberhard et al. | 361/127 |
| 4,930,039 | 5/1990 | Woodworth et al. | 361/127 |
| 4,962,440 | 10/1990 | Johnnerfelt et al. | 361/126 |
| 5,003,689 | 4/1991 | Doone et al. | 29/613 |
| 5,043,838 | 8/1991 | Sakich | 361/117 |
| 5,047,891 | 9/1991 | Nedriga | 361/117 |
| 5,128,824 | 7/1992 | Yaworski et al. | 361/127 |
| 5,138,517 | 8/1992 | Raudsbaugh | 361/117 |
| 5,225,265 | 7/1993 | Prandy et al. | 428/138 |
| 5,291,366 | 3/1994 | Giese et al. | 361/127 |
| 5,497,138 | 3/1996 | Malpiece et al. | 338/21 |

SELF-COMPRESSIVE SURGE ARRESTER MODULE AND METHOD OF MAKING SAME

BACKGROUND OF THE INVENTION

The present invention relates generally to electrical power distribution equipment. More particularly, the invention relates to sub-assemblies or modules that contain discrete electrical components and that are employed in protective devices such as surge arresters. Still more particularly, the invention relates to apparatus and methods for applying an axially-compressive force to an array of electrical components and retaining those components under compression in end-to-end relationship within the module.

Under normal operating conditions, electrical transmission and distribution equipment is subject to voltages within a fairly narrow range. Due to lightning strikes, switching surges or other system disturbances, portions of the electrical network may experience momentary or transient voltage levels that greatly exceed the levels experienced by the equipment during normal operating conditions. Left unprotected, critical and costly equipment such as transformers, switching apparatus, computer equipment, and electrical machinery may be damaged or destroyed by such over-voltages and the resultant current surges. Accordingly, it is routine practice within the electrical industry to protect such apparatus from dangerous over-voltages through the use of surge arresters.

A surge arrester is a protective device that is commonly connected in parallel with a comparatively expensive piece of electrical equipment so as to shunt or divert the over-voltage-induced current surges safely around the equipment, thereby protecting the equipment and its internal circuitry from damage. When caused to operate, a surge arrester forms a current path to ground having a very low impedance relative to the impedance of the equipment that it is protecting. In this way, current surges which would otherwise be conducted through the equipment are instead diverted through the arrester to ground. Once the transient condition has passed, the arrester operates to open the recently-formed current path to ground, thereby again isolating the distribution or transmission circuit in order to prevent the non-transient current of the system frequency from "following" the surge current to ground, such system frequency current being known as "power follow current."

Conventional surge arresters typically include an elongate outer enclosure or housing made of an electrically insulating material, a pair of electrical terminals at opposite ends of the enclosure for connecting the arrester between a line-potential conductor and ground, and an array of other electrical components forming a series path between the terminals. These components typically include a stack of voltage-dependent, nonlinear resistive elements. These non-linear resistors or "varistors" are characterized by having a relatively high resistance at the normal steady-state voltage and a much lower resistance when the arrester is subjected to transient over-voltages. Depending on the type of arrester, it may also include one or more spark gap assemblies housed within the insulative enclosure and electrically connected in series with the varistors. Some present-day arresters also include electrically conducting spacer elements coaxially aligned with the varistors and gap assemblies. Electrodes of a variety of types and configurations may also be included in the component array in conventional arresters.

For an arrester to function properly, it is important that contact be maintained between the ends of the various surge arrester components in the array. To accomplish this, an axial load is placed on the elements in the array. Such loading is typically applied by employing springs within the housing to urge the stacked elements into engagement with one another. Good axial contact is important to ensure a relatively low contact resistance between the adjacent faces of the components, to ensure a relatively uniform current distribution through the elements, and to provide good heat transfer between the arrester elements in the array and the end terminals.

Another conventional means for supplying the required axial force is to wrap the stack of arrester elements with glass fibers so as to axially-compress the elements within the stack. Examples of such prior art surge arresters include U.S. Pat. Nos. 5,043,838, 5,138,517, 4,656,555 and 5,003,689. These patents generally describe rather elaborate techniques for winding the fibers about the ends of a stack of arrester components to apply the appropriate axial force to the components within the stack. Employing certain of these techniques requires the inclusion of specially-configured components within the stack, such as special end terminations for maintaining specific separations between the fibers (for example, U.S. Pat. No. 5,043,838) or for creating a shoulder against which the fibers can be wound (for example, U.S. Pat. No. 5,138,517).

In addition to maintaining an axial compression, these stacked arrester components must be retained in such a manner that will permit gases evolved during arrester failure to be safely vented from the arrester. Occasionally, a transient overvoltage condition may cause some degree of damage to one or more of the resistive elements. Damage of sufficient severity can result in arcing within the arrester housing, leading to extreme heat generation and gas evolution as the internal components in contact with the arc are vaporized. This gas evolution causes the pressure within the arrester to increase rapidly until it is relieved by either a pressure relief means or by the rupture of the arrester housing. The failure mode of arresters under such conditions may include the expulsion of components or component fragments at high velocities and in all directions. Such failures pose potential risks to personnel and equipment in the vicinity.

Attempts have been made to design and construct arresters that will not catastrophically fail with the expulsion of components or component fragments. One such arrester is described in U.S. Pat. No. 4,404,614 which discloses an arrester having a non-fragmenting liner and outer housing, and a pressure relief diaphragm located at its lower end. A shatterproof arrester is also disclosed in U.S. Pat. Nos. 4,656,555, 4,930,039 and 5,113,306. Arresters having pressure relief means formed in their ends are described in U.S. Pat. Nos. 3,727,108, 4,001,651, and 4,240,124. U.S. Pat. No. 5,043,838 discloses a filament wrapped arrester module that includes openings between the crisscross pattern of windings. These openings are filled with an epoxy or similar insulating material that is permitted to rupture to allow the expulsion of gasses.

Despite such advances, however, state of the art arresters may still occasionally fail with the expulsion of components or fragments of components. This may, in part, be due to the fact that once the internal components in these arresters fail, the resulting arc vaporizes the components and generates gas at a rate that cannot be vented quickly enough to prevent rupture of the arrester enclosure. Accordingly, there remains a need in the art for an arrester which, upon failure, will fail in a non-fragmenting and safe manner. A need also exists for an arrester whose components are axially compressed without the use of a spring.

There further remains a need in the art for a means to compress axially an array of arrester components that may be applied simply and easily, without elaborate and costly manufacturing procedures or the addition into the component stack of specialized components. Preferably, the means would be easily applied to the external surfaces of the stacked components. It would be further advantageous if the compression means were to include features enhancing the tensile and cantilever strengths of the arrester assembly. Further, the device should provide a venting means for relieving gas pressure and preventing the electrical assembly from failing in a dangerous fashion, and should provide good bonding at each interface from the MOV stack outward without requiring complicated assembly procedures or costly waste.

SUMMARY OF THE INVENTION

The present invention comprises a surge arrester subassembly that includes a plurality of electrical components stacked in an axial array and an insulative coating disposed over the outer surface of the axial array. The coating is preferably bonded to the outer surface of the array and applies both axially- and radially directed forces to said array to maintain the components of the array in good electrical contact. According to the present invention, the coating has a coefficient of thermal expansion that is greater than the coefficient of thermal expansion of the electrical components and is cured at a temperature in the range of the operating temperature of the components, so that when the coated array is cooled below the cure temperature, the coating will tend to shrink more than the electrical components, thereby exerting compressive forces on the array. The present invention also may include both longitudinal and circumferential fibrous reinforcement within the coating, which reinforcement preferably comprises glass fibers. Those skilled in the art will understand that the present coating can be applied over the desired portions of the array so as to result in a predetermined coating thickness.

BRIEF DESCRIPTION OF THE DRAWINGS

For an introduction to the detailed description of the preferred embodiments of the invention, reference will now be made to the accompanying drawings, wherein.

DETAILED DESCRIPTION OF THE PREFERRED EMBODIMENTS

Figure 1:
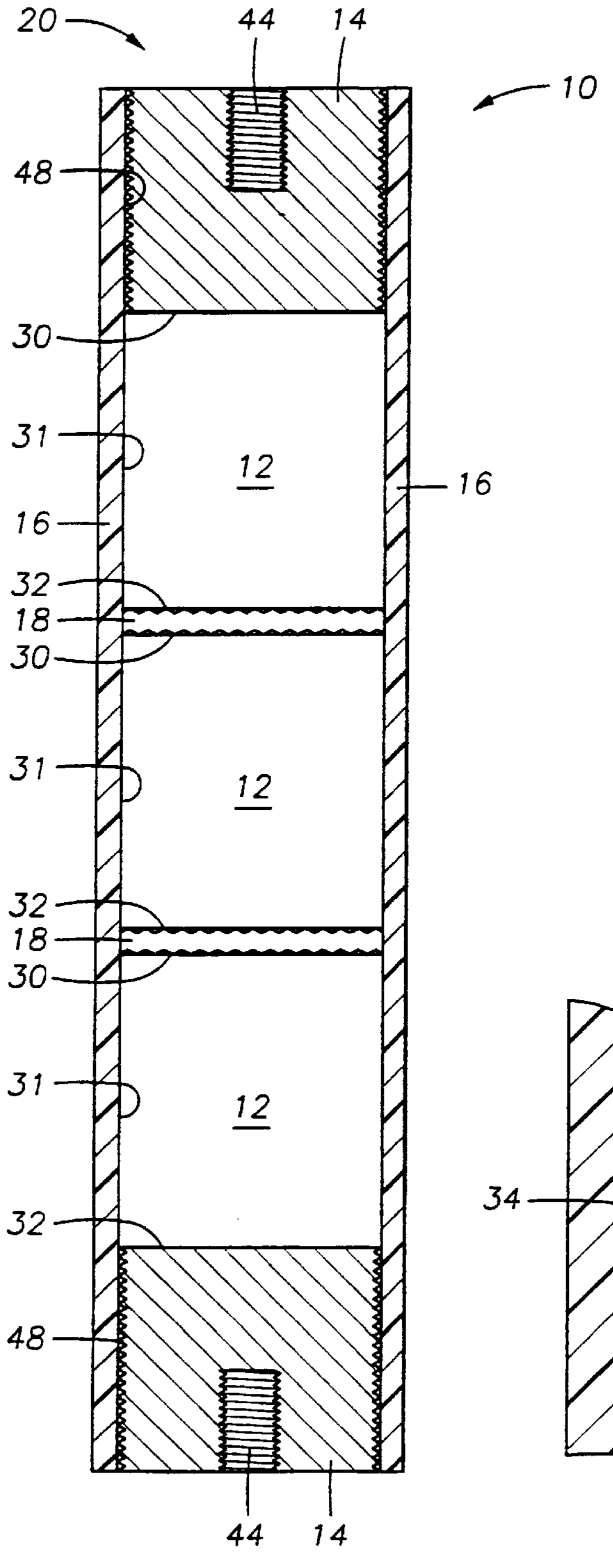
FIG. 1 is a cross-sectional view of an electrical subassembly module made in accordance with the present invention.
Figure 8:
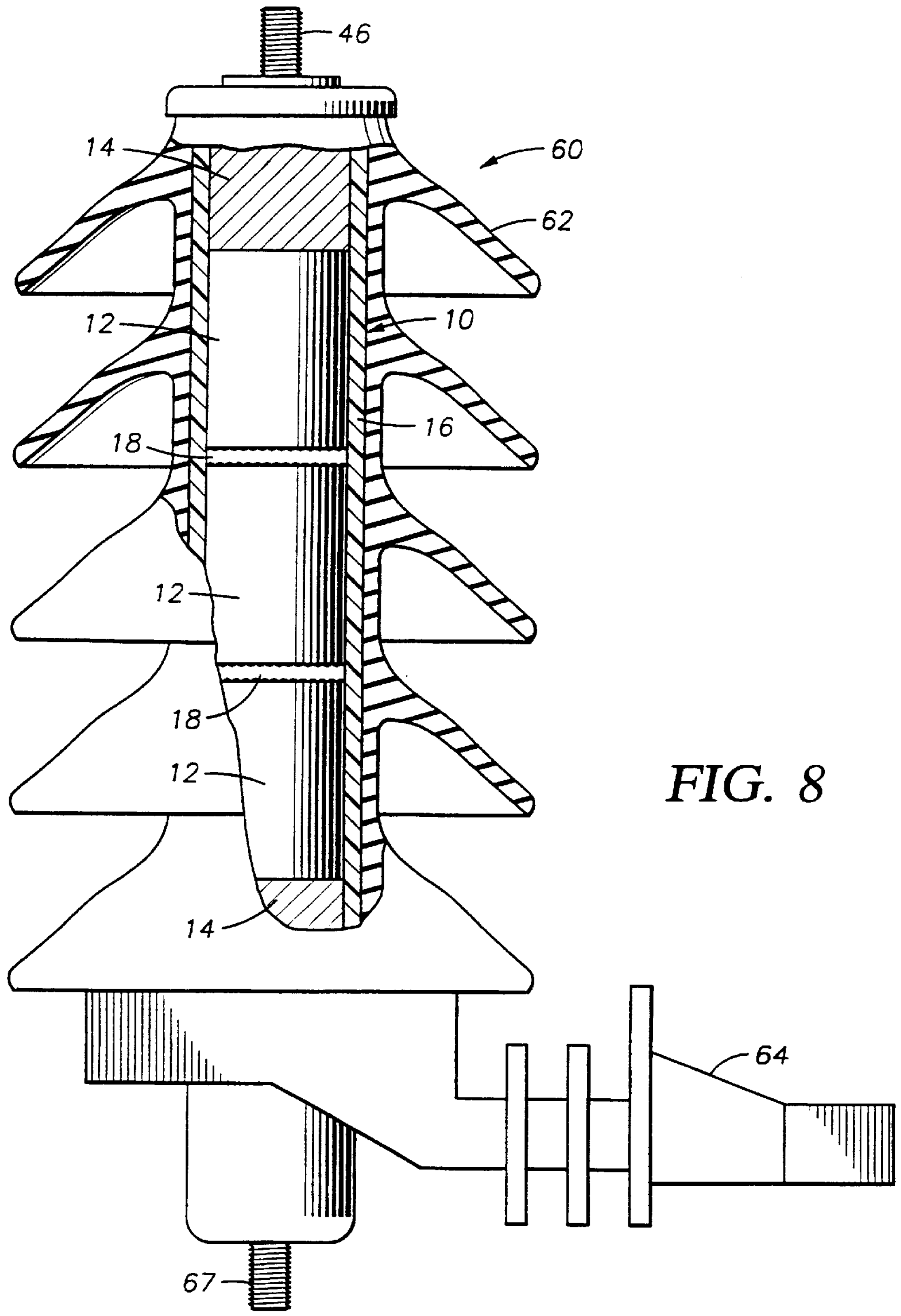
FIG. 8 is an elevation view of a surge arrester employing the subassembly module of FIG. 1.

Referring initially to FIGS. 1 and 8, there is shown a modular subassembly 10 of electrical components made in accordance with the present invention. Module 10 has particular utility when employed in a distribution class surge arrester such as arrester 60 (FIG. 8). Accordingly, to best describe the features and advantages of the present invention, module 10 will be described with reference to a 10 kA heavy duty 10 kV (8.4 kV MCOV) distribution class surge arrester 60. It should be understood, however, that the invention is not limited to use in a distribution class surge arrester, or in any size or rating of surge arrester, the invention instead having utility and advantages in any apparatus where it is necessary or desirable to retain an array or stack of electrical components under axial load.

Referring once again to FIG. 1, module 10 generally comprises an array 20 of electrical components stacked in end-to-end arrangement and retained in that arrangement by an axially applied force supplied by an insulative coating 16. The present invention relates to the coating 16, and is not limited to any particular type, number or size of electrical components within array 20; for purposes of explanation, however, array 20 is depicted in FIG. 1 as including three metal oxide varistors 12 ("MOV's"), a pair of terminal blocks 14 and a pair of contact plates 18.

Each MOV 12 is made of metal oxide that preferably is formed into a short cylindrical disk having an upper face 30, a lower face 32 and an outer cylindrical surface 31. The metal oxide for MOV 12 may be of the same material used for any high energy, high voltage MOV disk, and is preferably made of a formulation of zinc oxide. See, for example, U.S. Pat. No. 3,778,743 of the *Matsushita Electric Industrial Co., Inc.,* Osaka, Japan, incorporated herein by reference. In the preferred embodiment, MOV 12 will have a uniform microstructure throughout the MOV disk and the exponent n for the zinc oxide formulation of MOV 12 will be in the range of about 10–25 at the steady state system voltage. An exponent n of approximately 20 is most preferred. It is preferred that the circular cross-section of MOV 12 have a diameter between approximately 1 to 3 inches to insure that there is sufficient surface area of between about 0.785 and 7.07 square inches to maintain the desired durability and recoverability of the MOV's. At the same time, it is also desirable that MOV 12 have as small a cross-sectional area as possible in order to reduce the size, weight and cost of the arrester. As size is reduced, however, the durability and recoverability of the disk is lessened. Given these competing considerations, a diameter of approximately 1.6 inches is the most preferred. The thickness of MOV 12 as measured between faces 30 and 32 is preferably about 0.75 inches. As understood by those skilled in the art, given a particular metal oxide formulation and a uniform or consistent microstructure throughout the MOV disk, the thickness of the MOV disk determines the operating voltage level.

In the preferred embodiment, upper and lower faces 30, 32 of MOVs 12 are coated with sprayed-on metallized coatings of molten aluminum having a thickness approximately equal to 0.002 to 0.010 inches. MOV's 12 in the present invention are preferably formed without insulative collars on outer surface 31 as are typically employed in conventional arresters.

Figure 2:
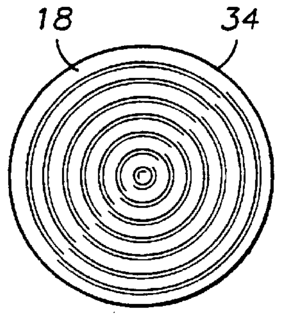
FIG. 2 is a top view of a grooved electrode of the subassembly module shown in FIG. 1.
Figure 3:
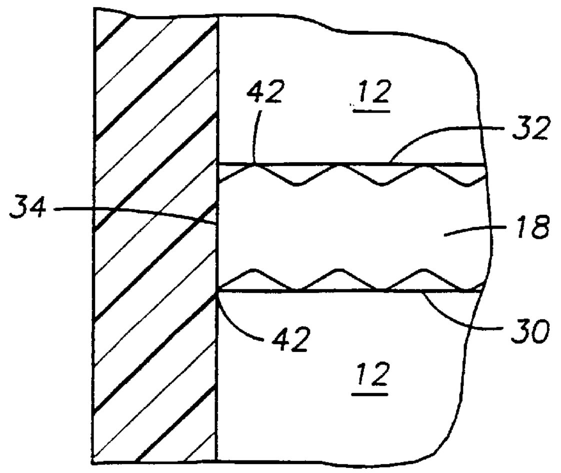
FIG. 3 is an enlarged view of a portion of the subassembly module shown in FIG. 1.

Contact plates 18 are disposed between the upper and lower faces 30, 32 of adjacent MOV's 12. As best shown in FIGS. 2 and 3, contact plates 18 generally comprise a metallic disk having outer edge 34. It is preferred that contact plates 18 include upper and lower ridged surfaces 38, 40 which generally take the form of concentric grooves such that an outermost ridge 42 is formed on each of the upper and lower surfaces 38, 40. Electrode 18 is preferably produced from annealed aluminum, but may also be made from brass or other conducting metals. Contact plates 18 have an outside diameter approximately equal to that of MOV's 12.

Figure 5:
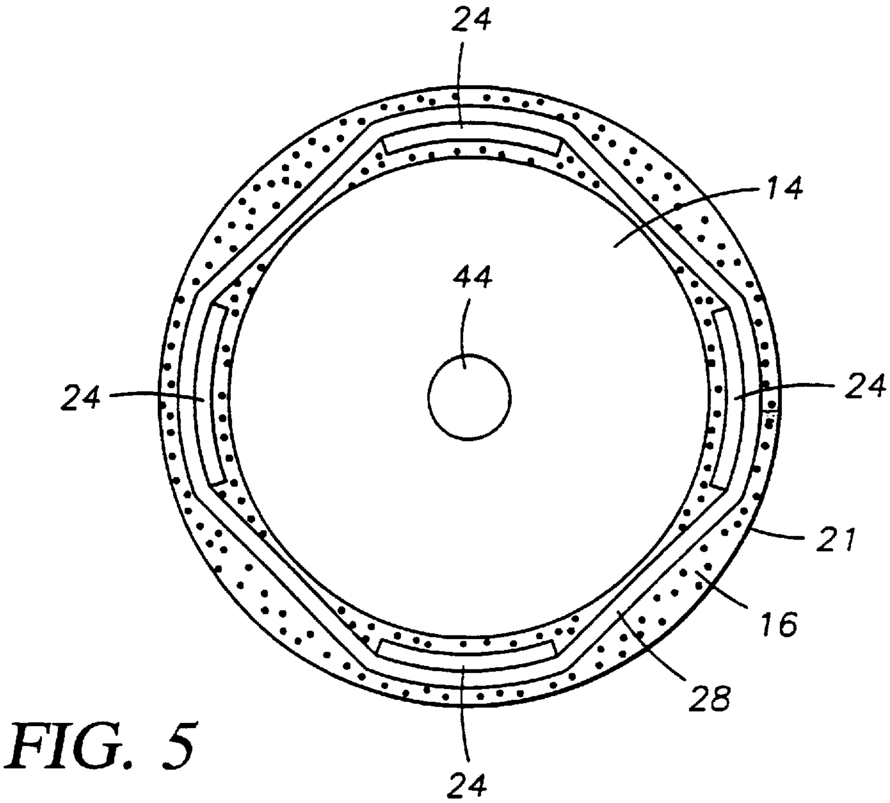
FIG. 5 is a top view of the subassembly module shown in FIG. 1.

As shown in FIGS. 1 and 5, terminal 14 is disposed at each end of array 20 and is a relatively short, cylindrical block machined or cast from any conducting material, preferably aluminum. Terminals 14 have a diameter substantially equal to that of the collarless MOV's 12 and contact plates 18, and include a threaded bore 44 for receiving a threaded conducting stud 46. The outer cylindrical surface 48 of the blocks may be knurled or ribbed or otherwise textured to facilitate the physical connection between the blocks and coating 16 as described more fully below.

Coating 16 retains MOV's 12, terminals 14 and contact plates 18 of array 20 in stacked, end-to-end relationship, and provides an axially compressive force as desired for insuring low contact resistance between the various electrical components and a uniform current distribution through the components. As described in detail below, coating 16 is bonded to the internal components and further seals the electrical components in array 20 preventing the undesired entry of moisture or other contaminants, and provides increased tensile and mechanical strength to the stacked array 20, and provides controlled venting of gases during an arrester failure.

Figure 4:
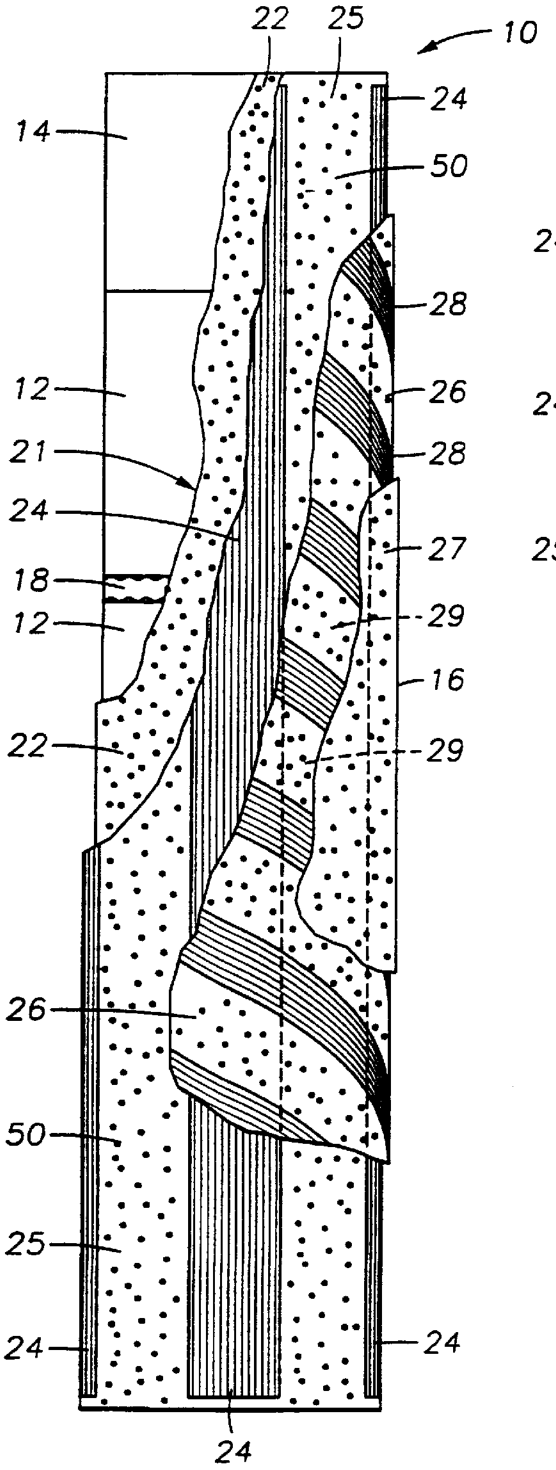
FIG. 4 is an elevational view of the module shown in FIG. 1 shown with layers of the insulative coating partially cut away.

Referring now to FIGS. 4 and 5, in its preferred form, coating 16 generally includes a matrix 21 of resinous layers and a plurality of axially aligned fibrous tape segments 24 and a spiral wrapped fibrous tape segment 28, segments 24 and 28 being embedded within matrix 21. As described in more detail below, matrix 21 preferably includes a base resinous layer 22 and three outer resinous layers 25–27 (FIG. 4). Resinous layers 22 and 25–27 are thermosetting resins selected from among the following: polyester resins, phenolic resins and epoxy resins.

The preferred resin further includes a flameout ingredient and particle fillers to control consistency, aid in modifying thermal expansion coefficient, and increase tensile strength, as known to those skilled in the art.

Resin layers 22, 25–27 may comprise a single resin formulation, or they may comprise two to four different resins. The resins used for layers 22, 25–27 are selected so as to have similar cure temperatures and so as to be mutually compatible with the other resin layers making up matrix 21. Further, the resin of matrix 21 must be stable at high temperatures and high voltages, meaning that the cured resins in matrix 21 must not depolymerize or lose bonding strength at the temperatures and voltages to which the components in array 20 will be subjected during operation. Normal operating temperatures are typically between −60 and +60° C. Failure mode temperatures can be as high as 350° C. The material selected for layers 22, 25–27 undergoes no thermal degradation at or below the failure temperature of the electrical equipment.

According to the preferred embodiment, it is important that insulative coating 16, when cured, have a coefficient of thermal expansion that is greater than the coefficient of thermal expansion of the electrical components in array 20. This will ensure that, at any temperature below its cure temperature, coating 16 will exert axially and radially compressive forces on array 20. The components in array 20 typically have an average coefficient of thermal expansion in the range of $5\times10^6$ to $25\times10^6$ in/in/°C., so it is desired that the material(s) of which coating 16 is formed have an coefficient of thermal expansion of at least $50\times10^6$ to $250\times10^6$ in/in/°C.

Each of layers 22, 25–27 may be applied by conventional spraying, dipping, rolling, powder falling, or fluidized bed methods, whichever is appropriate or convenient, depending upon the particular consistency of the resinous material and the equipment available. In the preferred embodiment of the invention, layers 22, 25–27 of coating 16 are applied using a conventional fluidized bed process.

As best shown in FIG. 4, base layer 22 is applied to the outer cylindrical surfaces 31 of MOV's 12, outer surfaces 48 of terminals 14, and outer edge 34 of contact plates 18 and is applied so as to have a substantially uniform thickness of approximately 0.001 to 0.015 inches. Base layer 22 is chosen to have a high bonding strength to MOV's 12. Because of its ability to strongly adhere to the components of array 20, base layer 22 forms a secure base for the other constituents of coating 16, specifically tapes 24, 28 and outer layers 25–27. It is also preferred that, relative to layers 25–27, the resin of base layer 22 be relatively quick to achieve a first level of hardness so that tape segments 24, described below, are not placed in direct contact with the elements of array 20.

Referring now to FIGS. 4 and 5, it is preferred that axially aligned fibrous tape segments 24 are resin impregnated fiberglass tape comprised of multiple fiberglass strands or bundles of strands that are arranged side by side in parallel rows and retained in that parallel relationship by the B-stage thermosetting resin that is preimpregnated or embedded within and surrounding the bundles. Preferably, for the array shown in FIGS. 1 and 4, fiberglass tape 24 is B-stage resin impregnated tape that is approximately 0.10 inches thick by 0.750 inches wide and has a length substantially equal to the length of array 20. Four segments of tape 24 are applied over inner base 22 in spaced-apart configuration in respective quadrants about the periphery of array 20 so as to provide untaped, longitudinally aligned gaps 50, which in the embodiment described herein, are approximately 0.125 to 0.625 inches wide.

Referring still to FIGS. 4 and 5, insulative coating 16 preferably further includes spiral wrapped tape 28 that is disposed about array 20. Tape 28 is preferably also a B-stage resin impregnated fiberglass tape substantially identical to tape 24 previously described, except that tape 28 may be narrower. Tape 28 again includes fiberglass strands or bundles of strands arranged in parallel rows that are held in position by embedded thermosetting epoxy resin. In this embodiment, coating 16 preferably includes four turns of tape 28 disposed about the outer surface 48 of upper terminal 14 and lower terminal 14, and a plurality of spaced apart turns disposed about the central portion of array 20. Tape 28 is wrapped about the central portion of array 20 at a pitch of approximately 2 wraps per linear inch. In this configuration, coating 16 is formed with polygonal regions 29 that are comprised entirely of resin layers 22, 25–27 and are free from fibrous tapes 24 or 28. One or more tape segments 28 can be used to wrap the array 20 in this manner.

Resinous layers 25–27 are layers of resin that are applied separately as described below. Layers 25–27 are preferably, but not necessarily, are formed of the same resin as layer 22. Layers 25–27 must adhere securely to base layer 22 and are applied, in part, to ensure that the glass fibers and bundles in tapes 24, 28 are completely and adequately wetted prior to module 10 being cured. It may be desirable to use different resins for one or more of layers 25–27, such as, for example to enhance the ability to wet, resins of lower viscosity or slower cure rate may be desired. In any event, each resin should be mutually compatible with the other resins selected. Additionally, it is preferred that resins for layers 25–27 be relatively slower to cure as compared to base layer 22 so that tape segments 24, 28 may be pressed and embedded within the preceding resinous layer prior to the resin setting up or hardening to an extent that would prevent the tape from being pressed into the preceding layer. Upon final curing, the thickness of coating 16 is preferably approximately 0.005 to 0.050 inch.

The method for manufacturing module 10 of the present invention generally comprises the following steps. First, the components of array 20 are heated to a temperature of between about 150 to 275° C., the final temperature of this preheating step being dependent upon the type and characteristics of the resin(s) employed in coating 16. More specifically, the final preheat temperature is selected in the lower temperature range of 150 to 200° C. so as to reduce gel rates, while final cure temperature is set in the range of 225 to 275° C. Once heated, the components are then arranged in a conventional V-block type fixture in the desired axial relationship. An axially directed clamping force of between approximately 0 to 1500 psi is applied to the end terminals 14 of array 20. For convenience of manufacture, the component array is held in a horizontal plane. In order to maintain good contact during the coating process, a force sufficient to maintain component-to-component contact is required. To facilitate deformation of the ribs on contact plates 18, the preferred clamping force is approximately 50 to 150 psi. The clamping force should be sufficient to ensure that MOV's 12, contact plates 18 and terminals 14 are in complete contact over substantially their entire areas of abutment. Good contact between the adjacent components in array 20 is important for uniform current distribution, low resistance and optimal heat dissipation through the stacked array 20.

When the axial force is applied in the predetermined magnitude, the ridges in contact plates 18, to varying degrees, bite or embed themselves into the adjacent faces 30, 32 of MOV's 12 to compensate for irregularities in MOV surfaces 30, 32. Additionally, contact plates 18 compensate for a degree of nonuniformity with respect to the thermal expansion of MOV's 12 during operation of the surge arrester, the ridges on contact plates 18 flex somewhat and allow continuous electrical contact. Contact plates 18 further serve to prevent the resinous layers 22, 25–27 of coating 16 from seeping between the opposing faces 30, 32 of adjacent MOV's or other components in array 20 that are not geometrically true or that have physical irregularities. Essentially, the outermost ridges 42 of contact plates 18 forms a seal around the periphery of each MOV-electrode-MOV interface.

Figure 6:
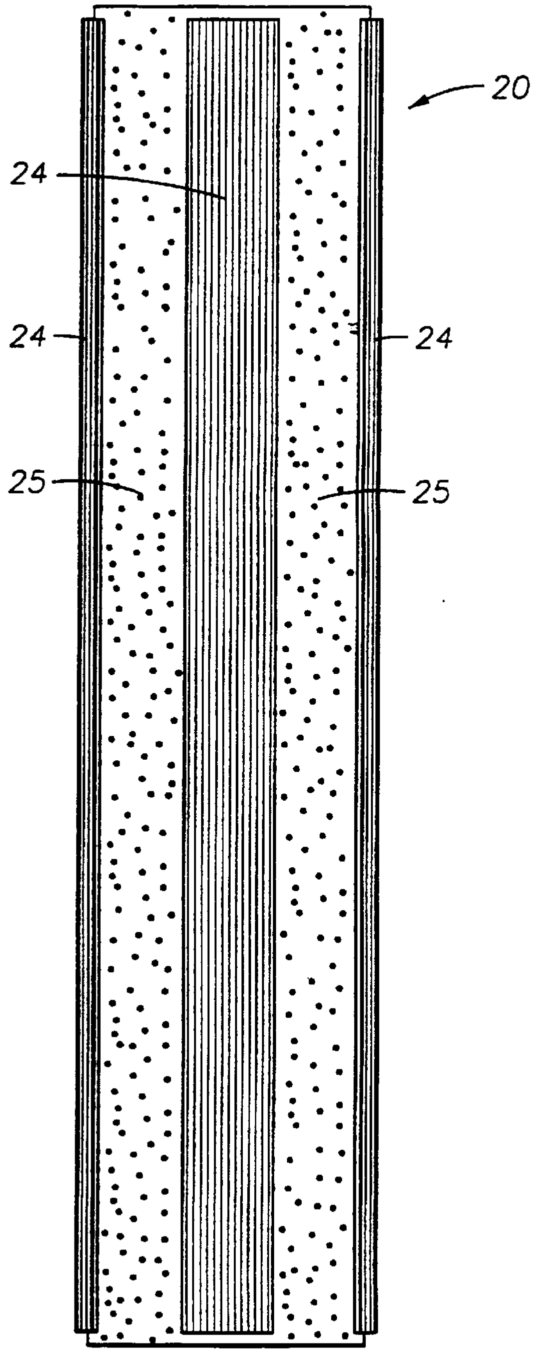
FIG. 6 is an elevational view of the module of FIG. 1 shown at an intermediate stage of assembly.

With the array's components axially loaded, base layer 22 is uniformly applied to the outer surfaces of the components in array 20. A thin coating (0.003 to 0.010 inches) of first outer layer 25 is immediately applied before the fast gelling layer 22 has started to gel. First outer layer 25 has a relatively slower rate of hardening than base layer 22 so as to permit fibrous tape segments 24 to be partially embedded within layer 25. Layers 22 and 25 serve to prevent fibrous tape segments 24 from contacting the outer radial surfaces of MOV's 12, terminals 14 and contact plates 18. It is important to avoid such contact because even though the fibrous tape has been impregnated with resin, it is still likely that minor levels of porosity or voids exist. It is important to minimize the level of porosity present in any dielectric coating, but this is especially important when in close proximity to the active electrical components in order to achieve good high current impulse durability. After layer 25 has been applied, tape strips 24 are pressed into first outer layer 25 so as to be partially embedded. Tape segments 24 are axially aligned and circumferentially spaced apart about the outer surfaces of components in array 20. At this point, module 10 has the configuration shown in FIG. 6.

After tape segments 24 have been embedded within first outer layer 25, the partially assembled module 10 coated with second outer layer 26. An important function of layer 26 is to ensure that the fiberglass strands or bundles within tape segments 24 are well wetted (resin saturated) and to ensure that no voids are created within coating 16.

Figure 7:
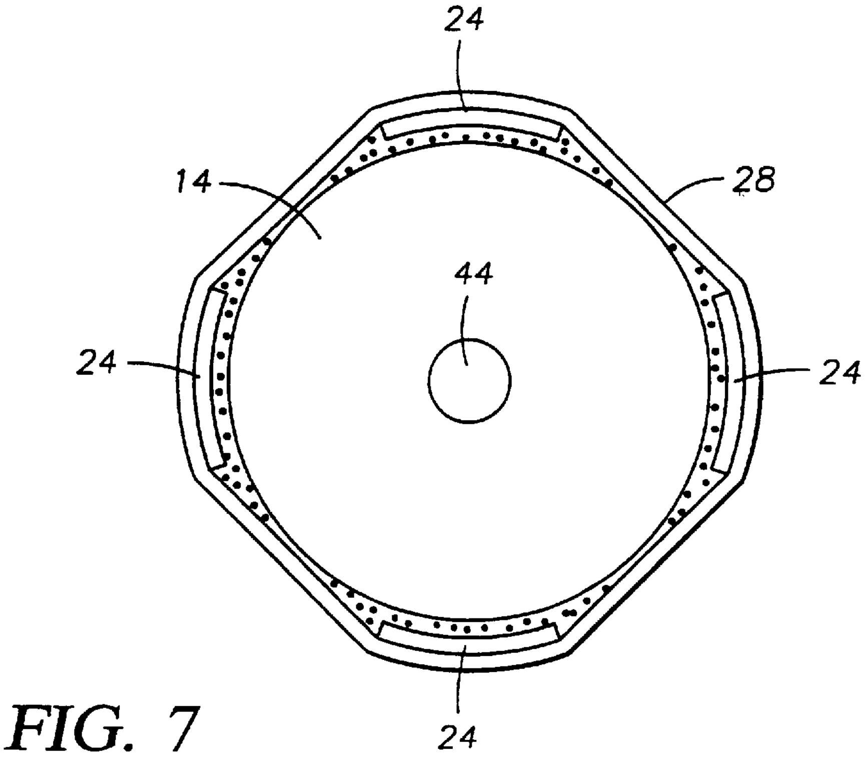
FIG. 7 is an end view of the module of FIG. 1 shown at another intermediate stage of assembly.

After layer 26, tape 28 is applied. Beginning at one end of array 20, tape 28 is wrapped approximately four times around the knurled outer surface 48 of upper terminal 14 and then wound about the central portion of array 20 in a spiral fashion. The wrapping step is preferably completed with four final turns of tape 28 about lower terminal 14. Tape 28 is wrapped about array 20 at a time when layer 26 is still relatively soft such that tape 28 is at least partially embedded in layer 26. FIG. 7 shows module 10 at this stage of assembly. After tape 28 has been applied, module 10 is coated with a final outer layer 27.

Although layers 25–27 may comprise different resins, it is presently preferred that layers 25–27 consist of the same resinous material. Further, although coating 16 has been described as have three discretely-applied outer layers 25–27 of resinous material, in practice, any desired number and combination of outer layers may be applied. While three such layers are presently preferred in the preferred embodiment, the important function served by the outer layers 25–27 is to thoroughly wet the fibers in tapes 24, 28 and depending on numerous factors, such as the characteristics of the resinous materials and of tapes 24, 28, this may be accomplished with more or fewer number of layers.

After final outer layer 27 has been applied, array 20, still held in compression by a clamping mechanism (not shown), and coating 16 are subjected to curing temperature so that layers 22 and 25–27 will cross-link and harden. Matrix 21, comprising resin layers 22 and 25–27 are cured at a temperature which is well above the normal steady state operating temperature of the module, which is typically about 60° C. It is preferred that the final curing take place at a temperature above the maximum temperature that will be experienced by module 10 during operation. In instances when module 10 is employed in a surge arrester, the matrix 21 should cure at a temperature above the temperature that the module is likely to experience during a transient overvoltage. Such temperatures may be, for example, 250° C. or more. Accordingly, the resins chosen for use in matrix 21 are preferably those that cure at a temperature of 250° C. or more. During the final cure, module 10 shown in FIGS. 1 and 4 will typically remain in an oven for approximately 10 to 30 minutes at the predetermined cure temperature before being removed from the oven and allowed to cool to room temperature. Because the resin layers 22, 25–27 are not completely cured until the final curing process, layers 22, 25–27 become integral with each adjacent layer, rather than forming discrete, discernable strata.

In some cases, the shrinkage due to cure is enough to result in adequate compressive force such that the assembly would not have to be cured at the elevated temperature. It is preferred, however, that insulative coating 16, after curing, have a coefficient of thermal expansion that is greater than the coefficient of thermal expansion of the electrical components in array 20. As a result, upon cooling of the module 10, insulative coating 16 shrinks more than array 20 and thus imposes axially- and radially-compressive forces on array 20 to ensure that the components in array 20 remain in stacked relationship and to ensure that good electrical connection is maintained between the components in array 20. If a coating having a higher coefficient of thermal expansion is used and shrinkage during cure is not considered, then the cure temperature would have to be higher than the temperature experienced by the components at designed operating temperature, so as to ensure compressive forces at operating temperatures.

The most severe temperatures experienced by state of the art arresters is in the range of 250 to 300° C. If a resin having a lower coefficient of thermal expansion were used, then the effects of low temperature operation would have to be considered. In this case, shrinkage during cure would be minimized in order to prevent cracking of the coating. In each case, the forces would be highest at the lowest temperatures. In any case, an object of this invention is to coordinate shrinkage during reaction (cure) and thermal expansion properties so as to maintain axial compression on the coated parts as well as to maintain a good dielectric interface to the component periphery. The art of coordinating thermal expansion mismatch is well understood by those skilled in the art. The novel aspect of the present invention is to use these coating parameters to control contact pressure in the stacked array of coated electrical components.

The degree of expansion mismatch is limited by the hardness and tensile strength of the coating. Generally, some degree of flexibility is desirable in order to control compressive forces over a narrower range. If materials are too hard or brittle, the force exerted on the MOV components will rise dramatically with falling temperature, while if the coatings are somewhat soft or elastic, the coating will begin to yield as forces increase.

With the presently preferred resins, particles of rubber filler such as ethylene vinyl acetate (EVA) or ethylene propylene rubbers (EPR) are used to enhance the flexibility of the cured resin. These systems can withstand large mismatches without cracking or debonding. The actual limits of mismatch and/or shrinkage have not been measured. Instead, a trial and error approach has been used to determine acceptable material parameters. A processed arrester module was subjected to 50 thermal shock cycles of fast heating to 120° C. followed by quenching at two high current impulses such as those required by ANSI C62.11-1991. The sample was then inspected for damage as well as change in operating characteristics. A longer term multi-stress test (NEL DY1009) was used to assure that dielectric interfaces remained intact. Material systems meeting these test criteria were then subjected to a complete set of design tests per ANSI C62.11-1991 and IEC 99.4-1993.

Hardened matrix 21, in conjunction with longitudinally aligned fiberglass tape segments 24 and spiral wrapped tape segment 28, provides sufficient cantilever strength to module 10 to permit the module to tolerate the external forces that may be applied to the array when in use, such as in surge arrester 60 where the arrester and module will be subjected to wind forces and other unintentional, but occasionally-occurring, forces such as those that might be applied to the arrester during shipment or installation by utility personnel.

In addition to providing the required strength and rigidity to module 10, insulative coating 16 further includes a venting means permitting the module 10 to vent gas that may evolve during arrester component failure. In particular, polygonal regions 29 serve as weakened wall regions through which venting may occur during component failure. More specifically, when an MOV 12 or other internal component in array 20 fails, the pressure within module 10 will build as the internal arc bums adjacent materials. As the arc bums, the pressure within module 10 will increase until it reaches a magnitude that will cause weakened wall regions 29 to burst, so as to relieve the internal pressure and vent the evolved gas.

Referring briefly to FIG. 8, there is shown a distribution class surge arrester 60 that employs module 10 previously described. Arrester 60 generally includes module 10, polymeric housing 62, and arrester hanger 64. Module 10 is disposed within polymeric housing 62 with an RTV silicone compound (not shown) filling any voids between module 10 and the inner surface of housing 62. A threaded conducting stud 46 is disposed in bore 44 of each terminal 14. Upper stud 46 extends through housing 62 for threadedly engaging a terminal assembly (not shown). Lower stud 46 extends through an aperture (not shown) in hanger 62 for connection to ground lead disconnector 65. Threaded stud 67 extends from disconnector 65 for engaging a ground lead terminal assembly (not shown). Housing 12 is sealed about module 10 at its upper and lower ends.

Figure 9:
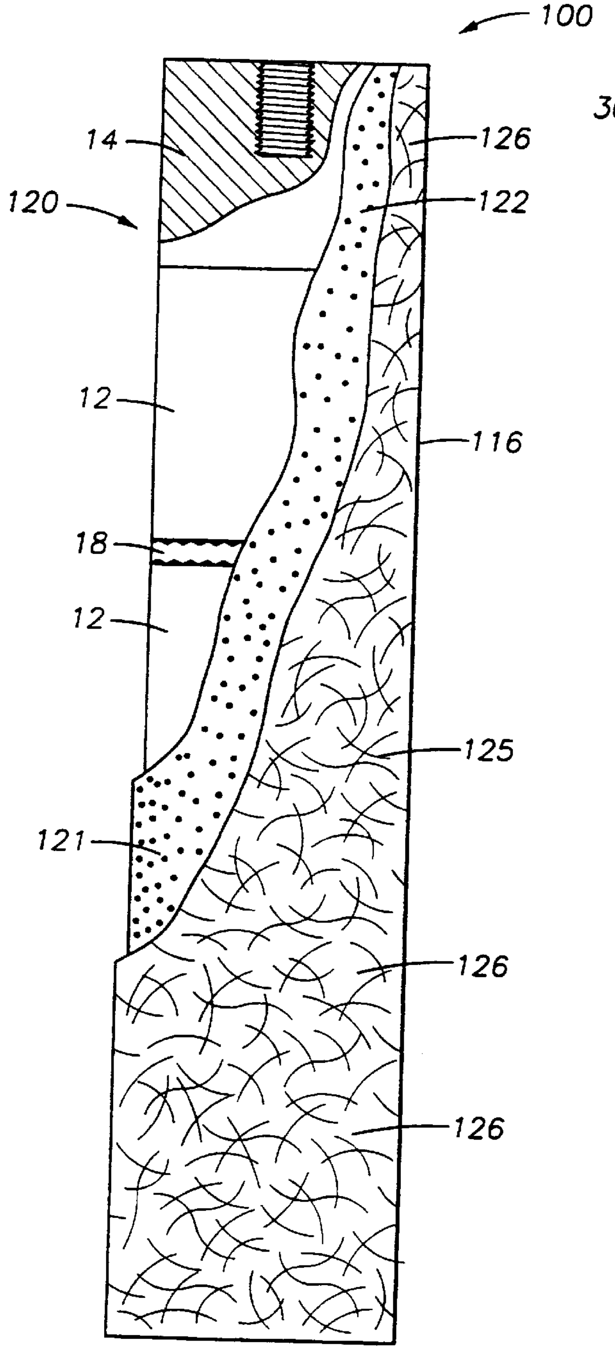
FIG. 9 is an elevational view of an alternative embodiment of the present invention, with portions of the insulative coating partially cut-away.

Referring now to FIG. 9, there is shown an alternative embodiment of the present invention that includes module 100 containing an array 120 of electrical components that include MOV's 12, contact plates 18 and terminals 14, all as previously described. In this embodiment, module 100 includes an insulative coating 116 comprising a matrix 121. Matrix 121 includes a base layer of resinous material 122, substantially the same as resinous layer 22 previously described with reference to FIGS. 1–7. Matrix 21 further includes one or more outer layers 125 of resinous material that has included therein relatively short fiber strands 126 intermixed with the resin material. Base layer 122 and outer layer or layers 125 are applied by means of a fluidized bed or other known technique and cured as previously described with reference to the curing of insulative coating 16. After curing, insulative coating 116 applies an axially compressive force to the arrester components in array 120. Coating 116 has a coefficient of thermal expansion that is greater than the coefficient of thermal expansion of the components in array 120. Additionally, the fiberglass strands 126 randomly disposed within layers 125 provide strength and rigidity to module 100.

Figure 10:
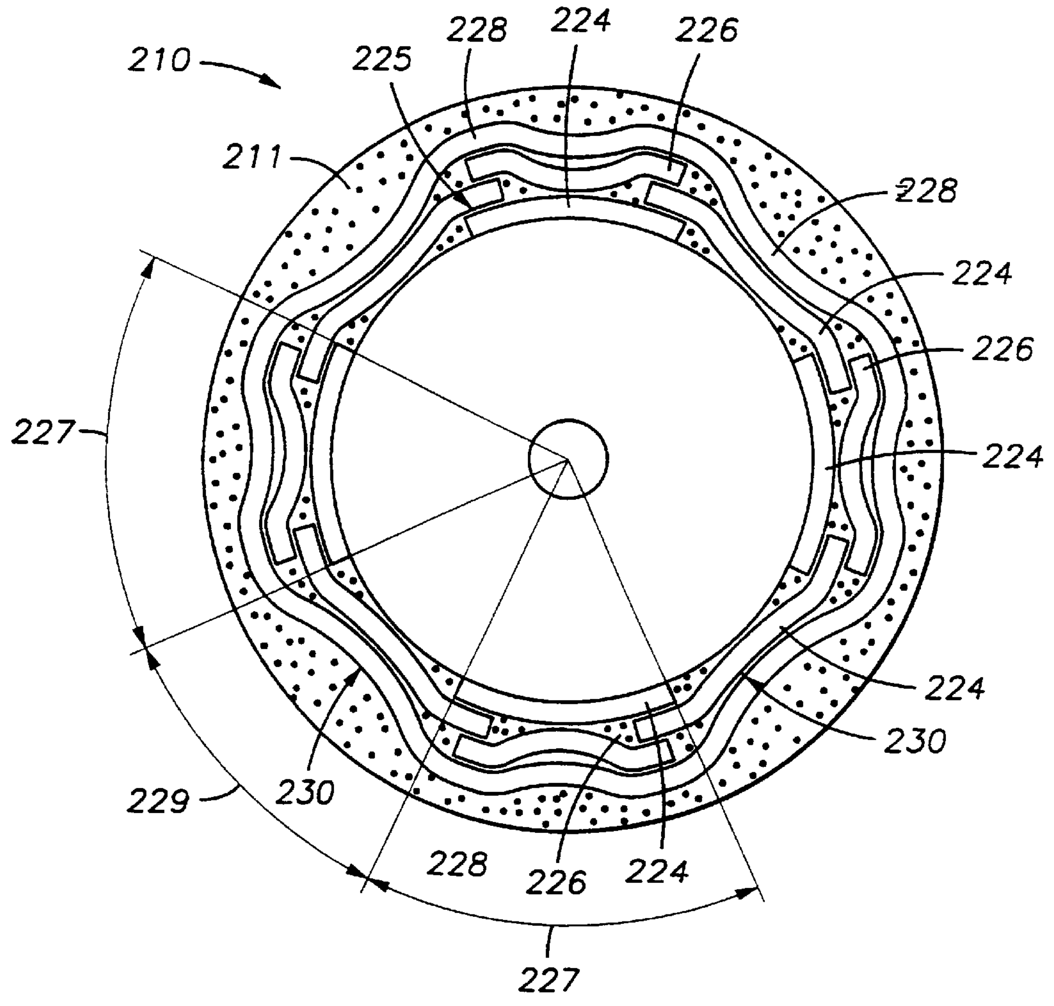
FIG. 10 is a top view of another alternative embodiment of the present invention.

Referring now to FIG. 10, module 210 is shown in top view to best disclose another embodiment of the invention. According to the invention, module 210 includes an axial array of MOV's 12 and contact plates 18 and terminals 14, all as previously described, that are coated and held in axial compression by insulative coating 211. Coating 211 includes resinous layers 22, 25–27 all as previously described. Coating 211 further includes a plurality of axially aligned pre-impregnated tape segments 224, 226 that are identified to tape segments 24 previously described. In this embodiment, however, the lateral edges of the innermost tape segments 224 are overlapped so that the entire circumference of the array of electrical components is covered by a layer 225 of axially-aligned tape segments 224. The module 210 further includes axially-aligned tape segments 226 that are disposed at predetermined locations about layer 225 to provide arcuate regions 227 having multiple thicknesses of tape 224, 226 and other arcuate regions 229 having single thickness of tape 224. A resinous layer that may be identical to any one of the previously-described outer layers 25–27 is applied between the taped layer 225 and tape segments 226 and another layer applied over the module 210 after tape segments 226 have been applied to thoroughly wet all tape segments 224 and 226. Thereafter, spiral wrapped tape segments 228 is applied outside tape segments 224 and 226 and a final outer resinous layer is applied. After the module 210 is cured, module 210 will include relatively weaker wall regions 230 corresponding to regions 229 that have relatively thin regions of glass fiber reinforcement as compared to regions 227. As will be recognized by those skilled in the art, relatively weaker wall regions 230 and regions 227 may have any number of thicknesses of tape segments 224, 226 provided that the relatively weaker wall regions 230 have fewer thicknesses of tape 224, 226 than regions 227. The embodiment thus described has particular application in surge arresters having a relatively large number of components in array 220 or where the MOV's are larger than MOV's 12 previously described, as may be the case with surge arresters having higher voltage or duty ratings than arrester 60 shown in FIG. 8.

Figure 11:
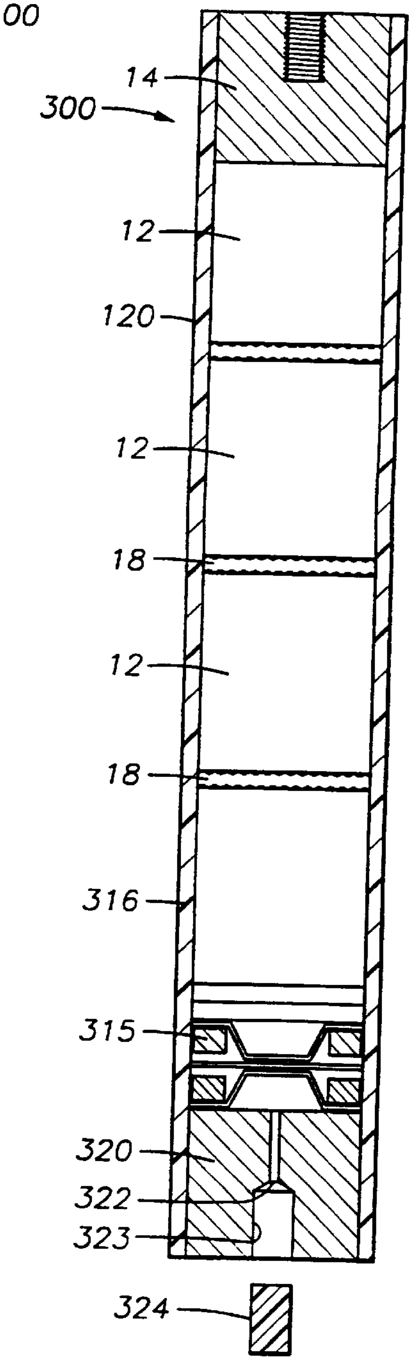
FIG. 11 is a cross-sectional view of an alternative electrical subassembly made in accordance with the present invention.

Referring now to FIG. 11, there is shown an alternative embodiment of the present invention that includes module 300 containing an array 120 of electrical components that include MOV's 12, contact plates 18 and terminal 14, all as previously described, and spark gap assemblies 315. In this embodiment, module 300 includes an insulative coating 316. As described above, coating 316 retains MOV's 12, terminals 14, contact plates 18 and spark gap assemblies 315 in stacked, end-to-end relationship, and provides an axially compressive force as desired for insuring low contact resistance between the various electrical components and a uniform current distribution through the components. As described in detail above, a preferred embodiment of coating 316 includes a matrix of resinous layers, a plurality of axially aligned fibrous tape segments and a spiral wrapped fibrous tape segment, with the tape segments being embedded in the matrix. Coating 316 is bonded to the internal components and further seals the electrical components, preventing the undesired entry of moisture or other contaminants. Coating 316 applies axial and radial compressive forces and provides increased tensile and mechanical strength to the stacked components, and provides controlled venting of gases during an arrester failure.

Because spark gap assemblies 315 contain air, it has been found preferable to position spark gap assemblies 315 adjacent one end of module 300 and to include in module 300 a vented terminal 320 that includes a borehole 322 adjacent spark gap assemblies 315. Borehole 322 allows air contained in spark gap assemblies 315 to escape as it expands during the heating process, and allows the re-entry of air into spark gap assemblies 315 when the module 300 returns to room temperature following cure. Venting the module in this manner during heating and cooling prevents the final product from having an internal pressure that is different from ambient. If no borehole 322 were provided and module 300 were sealed at the elevated coating temperature, the pressure of the gas surrounding spark gap assemblies 315 would be well below one atmosphere when the sealed module cooled to ambient temperature.

Once module 300 is assembled, cured and cooled, and before it is inserted into a housing or similar device, a stopper 324, preferably of rubber or a similar resilient sealing material, is inserted into vented terminal 320 so as to close borehole 322. Vented terminal 322 is preferably constructed with a receptacle 323 for receiving stopper 324.

In constructing the module 300, it was found that the epoxy coating 316 did not stick as readily to spark gap assemblies 315 as it did to MOV's 12. In order to improve adhesion of coating 316 to spark gap assemblies 315, it is thus preferred to heat the stacked components to a higher temperature prior to applying the coating 316. Specifically, it is preferred to preheat the stacked components to at least 275° C. Similarly, because the spark gap assemblies 315 do not retain heat as well as MOV's, it is preferred that the time between the preheating step and the coating step be minimized so as to minimize the cooling that occurs.

Figure 12:
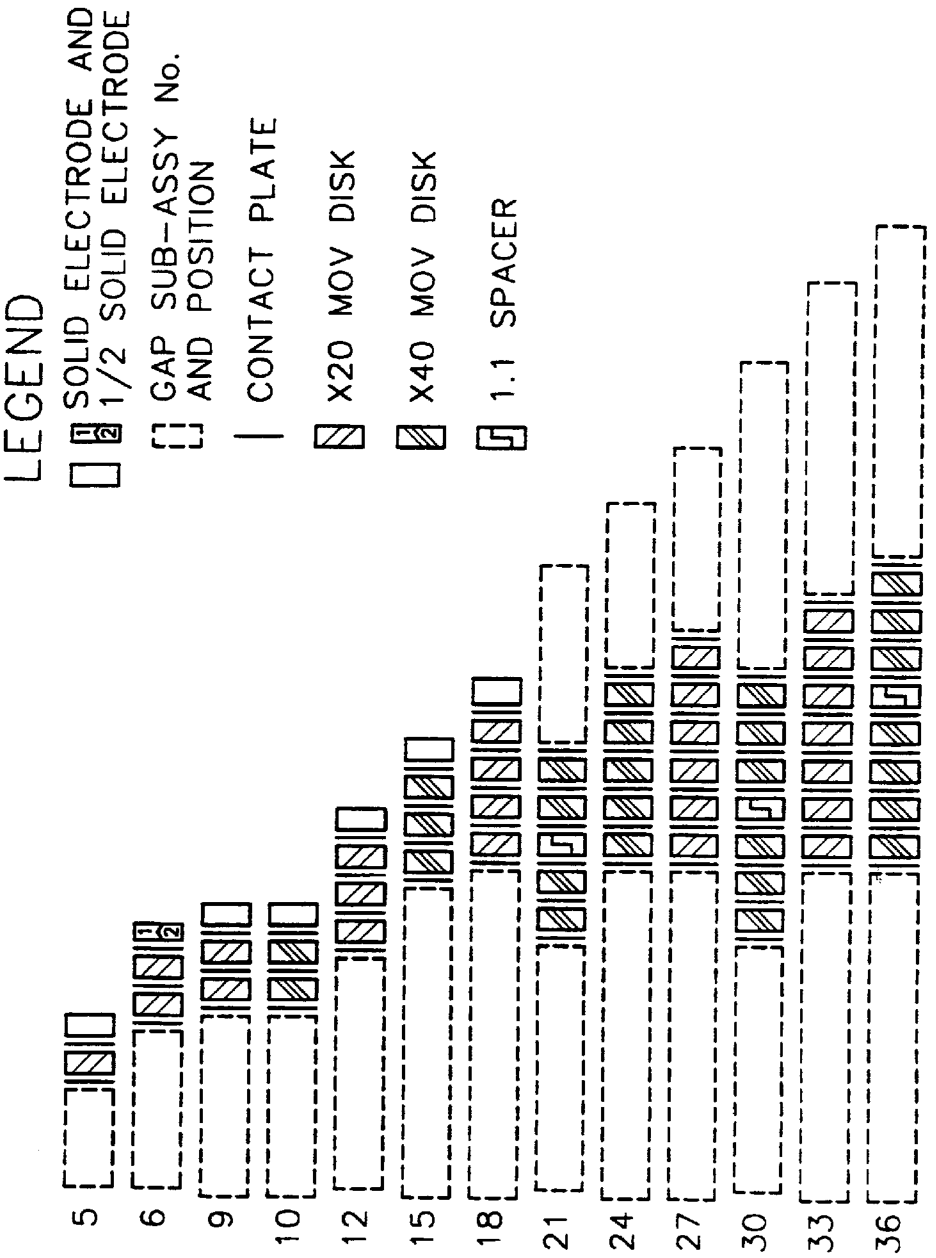
FIG. 12 shows alternative arrays of components that can be used in modules constructed in accordance with the present invention.

In order to facilitate manufacturing and assembly of modules 300, it is preferred to provide spark gap assemblies 315 in groups of three having a unit height equal to the unit height of the other components in module 300, namely MOV's 12 and terminals 14. In a most preferred embodiment the unit height of each type of component is 1.1 inches, which corresponds to the height of a single shed. Thus, a 9 kV surge arrestor having two MOV's 12 and three spark gap assemblies 315 would be the same height and would fit in the same size housing as a 9 kV surge arrestor having three MOV's and no spark gaps. This allows surge arrestors with and without spark gaps to be built interchangeably. The number and arrangement of spark gap assemblies 315 within the module 300 can be varied as needed. It is preferred that, if the number of spark gap assemblies 315 is large, they be divided between the two ends of module 300, so as to reduce electrical stress. Examples of arrays of electrical components that include various combinations of MOV's and spark gaps are shown in FIG. 12.

The rigid epoxy skin, together with end plug 320 and stopper 324, completely enclose and seal the components of the surge arrestor, making it suitable for use in a variety of environments, including under oil.

While the preferred embodiments of this invention have been shown and described, modifications thereof can be made by one skilled in the art without departing from the spirit of the invention. As an example, rather than employing preimpregnated fiberglass tapes 24, 28, unimpregnated fiberglass stranded tape may be employed to provide the desired strength and rigidity to module 10, provided that the strands or bundles are sufficiently wetted with each preceding and succeeding layer of resin. Furthermore, the invention does not require the use of tapes such as tapes 24, 28. Instead, parallel strands or bundles of strands of fiberglass, not in tape form, may be thoroughly wetted and embedded within successive resinous layers. Thus, the embodiments described herein are exemplary only and are not limiting. Many variations and modifications of the invention are possible and are within the scope of the claims that follow.

What is claimed is:

1. A subassembly for a surge arrester comprising:

electrical components including at least one pair of MOVs stacked in an axial array having an outer surface; and an insulative system including:

a first resin matrix layer bonded to said outer surface, a second resin matrix layer bonded to said first matrix layer, and a first reinforcing layer comprising spaced reinforcing strips embedded in said second matrix layer and extending along a length of said array.

2. The subassembly of claim 1 wherein said matrix layers and said reinforcing layer are essentially stable when subjected to high voltage and high temperature.

3. The subassembly of claim 2 wherein said matrix layers comprises at least one thermosetting resin.

4. The subassembly of claim 2 wherein said matrix layers comprise at least two thermosetting resins, wherein said resins are mutually compatible.

5. The subassembly of claim 3 wherein said thermosetting resin is selected from the group consisting of polyester, phenolic, and epoxy resins and has a cure temperature greater than the maximum expected failure mode temperature of said subassembly when used in a surge arrester.

6. The subassembly of claim 2 wherein reinforcing layer material is chosen from the group consisting of glass and ceramic, said reinforcing material being capable of modifying the coefficient of thermal expansion of said insulative systems.

7. The subassembly of claim 6 wherein all or a portion of said reinforcing layer material is fiberglass in the form of continuous finely divided fibers that extend along the entire length of said array.

8. The subassembly of claim 7 wherein said matrix layers provide bonding of said fibers to said array.

9. The subassembly of claim 8 wherein said fibers are resin-saturated and are arranged in at least two parallel groups, each group being in the form of a continuous strand of tape.

10. The subassembly of claim 8 wherein all or a portion of said fibers are continuous strands disposed spirally about said array and extending the length of said array.

11. The subassembly of claim 6 wherein said fibers are uniformly mixed with said matrix layers.

12. The subassembly of claim 6 wherein said coating insulative system comprises sections devoid of fibers, said areas being spaced at intervals along the length of said array.

13. The subassembly of claim 6 wherein a portion of said fibers are arranged as one or more linear groups extending the length of said array, and another portion of said fibers are arranged as one or more groups spirally extending the length of said array, said spiral groups terminating at each end of said array with at least four superimposed turns, each said spiral group being disposed over said linear groups, suitable matrix layer being disposed between said linear and spiral groups.

14. The subassembly of claim 13 wherein said linear fiber groups and said spiral fiber groups are disposed such that fiberless sections are defined at intervals along the length of said array.

15. The subassembly of claim 9 wherein said tape comprises a B-stage resin.

16. The subassembly of claim 2 wherein said matrix layers comprise a ceramic.

17. The subassembly of claim 2 wherein said matrix layers comprise glass.

18. The subassembly of claim 2 wherein said matrix layers comprise silicone rubber.

19. The subassembly of claim 6 further comprising venting means.

20. The subassembly of claim 19 wherein said venting means comprises regions of reduced strength in said insulative system.

21. The subassembly of claim 1 wherein said electrical components include MOVs and a conductive wafer disposed between each adjacent pair of MOVs, said wafer having crenellated upper and lower surfaces.

22. The subassembly of claim 21 wherein said electrical components further include at least one spark gap assembly.

23. The subassembly for a surge arrester of claim 1 wherein each strip of said first reinforcing layer is saturated with a partially cured resin arranged in an open array.

24. The subassembly for a surge arrester of claim 1, wherein the insulative system further comprises:

a third resin matrix layer, and a second reinforcing layer comprising a plurality of reinforcing strips disposed spirally about said outer surface, extending the length of said array, and terminating at each end of said array, said second reinforcing layer and said third matrix layer being at least partially embedded in said second matrix layer.

25. The subassembly for a surge arrester of claim 24, wherein the insulative system further comprises a fourth resin matrix layer covering said second reinforcing layer and said third matrix layer.

26. The subassembly for a surge arrester of claim 24 wherein each strip of said second reinforcing layer is saturated with a partially cured resin arranged in an open array, and said strips of said second reinforcing layer are narrower than said strips of said first reinforcing layer.

27. The subassembly for a surge arrester of claim 24 wherein the first and second reinforcing layers form an array including radial passages therethrough.

28. The subassembly for a surge arrester of claim 1 wherein said insulative system is bonded to said outer surface of said array and has a coefficient of thermal expansion that is greater than a coefficient of thermal expansion of said array, whereby axially and radially-directed forces are applied to said array at normal operating temperatures such that said components are held in electrical engagement and in axial alignment with one another.

29. The subassembly for a surge arrester of claim 1 wherein the strips of the first reinforcing layer are positioned in an approximately parallel relationship.

30. The subassembly for a surge arrester of claim 1 wherein the strips of the first reinforcing layer terminate at each end of said array without substantially overlapping an end surface of the array.

31. The subassembly for a surge arrester of claim 1 wherein the resin comprises a thermosetting resin.

32. The subassembly for a surge arrester of claim 31 wherein the resin comprises a thermosetting resin selected from the group consisting of polyester resins, phenolic resins and epoxy resins and compatible combinations thereof.

33. A subassembly for a surge arrester comprising:

a plurality of electrical components including at least one pair of MOVs, said components being stacked in an axial array and having an outer surface; and an insulative coating comprising a first matrix layer comprising a thermosetting resin selected from the group consisting of polyester resins, phenolic resins and epoxy resins and compatible combinations thereof said thermosetting resin being bonded to said outer surface;

a second matrix layer comprising a thermosetting resin selected from the same group as said first matrix layer, said second matrix layer being bonded to said first matrix layer;

a first fiber layer comprising spaced apart tape strips extending the length of said array, each strip comprising a multiplicity of fibers saturated with a B-stage polyester resin arranged in a parallel array, said strips being embedded in said second matrix layer;

a third matrix layer comprising a thermosetting resin selected from the same group as said first matrix layers;

a second fiber layer comprising a plurality of fibers saturated with a B-stage polyester resin and arranged in a parallel array in a second tape strip, said second strip being narrower than said first strip and being disposed spirally about said outer surface, extending the length of said array and terminated at each end of said array, said second fiber layer and said third matrix layer being at least partially embedded in said second matrix layer;

a fourth matrix layer of substantially the same thermosetting resin composition as said second matrix layer;

said coating being bonded to said outer surface of said array and having a coefficient of thermal expansion that is greater than the coefficient of thermal expansion of said electrical components, whereby anally and radially-directed force(s) are applied to said array at normal operating temperatures such that said components are held in electrical engagement and in axial alignment with one another.

34. The subassembly of claim 33 wherein said array further includes at least one spark gap assembly.

35. The subassembly of claim 34 wherein said array further includes a vented terminal at one end.

36. The subassembly of claim 35 wherein said vented terminal includes a borehole therethrough and said array further includes a stopper for closing said borehole.

37. An electrical assembly comprising the subassembly of claim 33 and a waterproof housing formed from and integral with said coating, said housing comprising a core disposed about said subassembly and a plurality of radial fins axially spaced apart along said core.

38. A subassembly for a surge arrester comprising:

electrical components including at least one pair of MOVs stacked in an axial stack having an outer surface; and an insulative system including:

a first resin matrix layer bonded to said outer surface, a second resin matrix layer bonded to said first matrix layer, a first reinforcing layer comprising spaced reinforcing strips embedded in said second matrix layer and extending along a length of said stack, each strip being saturated with a partially cured resin arranged in an open array, a third resin matrix layer, a second reinforcing layer comprising a plurality of reinforcing strips saturated with a partially cured resin arranged in an open array, said strips of said second reinforcing layer being narrower than said strips of said first reinforcing layer and being disposed spirally about said outer surface, extending the length of said stack, and terminating at each end of said stack, said second reinforcing layer and said third matrix layer being at least partially embedded in said second matrix layer, and a fourth resin matrix layer covering said second reinforcing layer and said third matrix layer;

said insulative system being bonded to said outer surface of said stack and having a coefficient of thermal expansion that is greater than a coefficient of thermal expansion of said stack, whereby axially and radially-directed forces are applied to said stack at normal operating temperatures such that said components are held in electrical engagement and in axial alignment with one another.

39. The subassembly for a surge arrester of claim 38 wherein the strips of the first reinforcing layer are positioned in an approximately parallel relationship.

40. The subassembly for a surge arrester of claim 38 wherein the strips of the first reinforcing layer terminate at each end of said stack without substantially overlapping an end surface of the stack.

41. The subassembly for a surge arrester of claim 38 wherein the resin comprises a thermosetting resin.

42. The subassembly for a surge arrester of claim 41 wherein the resin comprises a thermosetting resin selected from the group consisting of polyester resins, phenolic resins and epoxy resins and compatible combinations thereof.

43. The subassembly for a surge arrester of claim 38 wherein the first and second reinforcing layers form an array including radial passages therethrough.

44. A method of making an electrical subassembly for a surge arrester comprising the steps of:

preheating a plurality of electrical components to a temperature of between 300–500° Fahrenheit;

arranging said preheated components, including at least one pair of MOVs and a conductive wafer disposed between the MOVS, in an axial stack having an outer surface by placing said components in a fixture to form the stack;

applying axial force to the ends of said stack sufficient to provide good electrical contact between said components;

while maintaining said axial force and maintaining said components at a temperature of at least 150° Celsius, applying to the outer surface of said stack a first resin matrix layer comprising at least one mutually compatible dielectric material having high voltage stability and overlaying said first resin matrix layer with a second resin matrix layer, said first matrix layer being capable of curing faster than said second matrix layer, such that said first matrix layer becomes bonded to the outer surface of said stack and blended and/or bonded to said second matrix layer, said second matrix layer having a relatively softer exterior capable of at least partially embedding one or more reinforcing layers;

substantially covering the exterior of said second matrix layer with a first reinforcing layer comprising a plurality of radially spaced-apart strips of resin-impregnated tape, the spacing between adjacent tape strips being sufficient to permit venting of said stack during ionization events when used in a surge arrester and said resin impregnating the tape having high voltage stability;

keeping said fibers in resin-saturated condition, applying over the second matrix layer and the first reinforcing layer a third matrix layer of at least one mutually compatible dielectric material having high voltage stability, said third matrix layer forming a soft exterior capable of at least partially embedding one or more reinforcing layers;

applying over said third matrix layer a second reinforcing layer spirally disposed about said stack and extending the length of said stack, said second reinforcing layer including tape strips terminating at each end of said stack with at least two superimposed turns;

applying over said third matrix layer and said reinforcing layer a fourth matrix layer comprising at least one mutually compatible dielectric material having high voltage stability;

curing said matrix layers and resins for a sufficient time at a temperature that exceeds a maximum expected failure mode temperature of said electrical components when used in a surge arrester;

cooling the subassembly; and removing the axial force from the ends of the subassembly.

45. The method according to claim 44 wherein said preheating step includes providing with the MOV stack at least one spark gap assembly and a vented terminal.

46. The method of making an electrical subassembly for a surge arrester of claim 44 wherein the tape comprises a multiplicity of linearly aligned fibers, said fibers being chosen from the group comprising fiberglass, nylon, rayon and ceramics.

47. The method of making an electrical subassembly for a surge arrester of claim 44 wherein the resin layers comprise one or more materials having high voltage stability, each said material being chosen from the group consisting of thermosetting resins, ceramics, glass and silicone rubber.

48. A subassembly for a surge arrester comprising:

a plurality of electrical components including at least one pair of MOVs, at least one spark gap assembly, and a vented terminal, said components being stacked in an axial stack having an outer surface; and an insulative system including:

a first resin matrix layer bonded to said outer surface;

a second resin matrix layer bonded to said first matrix layer;

a first reinforcing layer comprising spaced apart reinforcing strips extending the length of said stack, each strip saturated with a partially cured resin arranged in an open array, said strips being embedded in said second matrix layer;

a third resin matrix layer;

a second reinforcing layer comprising a plurality of reinforcing strips saturated with a partially cured resin and arranged in an open array, said strips of said second reinforcing layer being narrower than said strips of said first reinforcing layer and being disposed spirally about said outer surface, extending the length of said stack and terminating at each end of said stack, said second layer and said third matrix layer being at least partially embedded in said second matrix layer; and a fourth resin matrix layer covering said second layer and said third matrix layer disposed over said outer surface of said axial stack, said coating being bonded to said outer surface of said stack and applying an axially-directed force to said stack to maintain said components in said stack in electrical engagement with one another;

said coating having a coefficient of thermal expansion that is greater than the coefficient of thermal expansion of said electrical components.

49. The subassembly for a surge arrester of claim 48 wherein the strips of the first reinforcing layer are positioned in an approximately parallel relationship.

* * * * *

UNITED STATES PATENT AND TRADEMARK OFFICE

CERTIFICATE OF CORRECTION

PATENT NO. : 6,008,975

DATED : December 28, 1999

INVENTOR(S) : Jeffrey Joseph Kester, et al.

It is certified that error appears in the above-identified patent and that said Letters Patent is hereby corrected as shown below:

On the title page [75],

"Tomon K. Raimondi, Olean, N.Y." should be --Timon K. Raimondi, Olean, N.Y.--

Signed and Sealed this

Eighteenth Day of July, 2000

*Attest:*

Q. TODD DICKINSON

*Attesting Officer*

*Director of Patents and Trademarks*